(12) United States Patent
Rainnie (10) Patent No.: US 7,941,640 B1
(45) Date of Patent: May 10, 2011

(54) SECURE PROCESSORS HAVING ENCODED INSTRUCTIONS

(75) Inventor: Hedley Rainnie, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 249 days.

(21) Appl. No.: 11/510,006

(22) Filed: Aug. 25, 2006

(51) Int. Cl.
*G06F 9/30* (2006.01)

(52) U.S. Cl. ........................ 712/209; 712/208

(58) Field of Classification Search ............ 712/208, 712/209, 210
See application file for complete search history.

(56) References Cited

U.S. PATENT DOCUMENTS

| | | | | |
|---|---|---|---|---|
| 5,148,528 | A * | 9/1992 | Fite et al. | 712/210 |
| 5,784,552 | A * | 7/1998 | Bishop et al. | 714/38 |
| 5,999,629 | A | 12/1999 | Heer et al. | |
| 6,154,865 | A * | 11/2000 | Gruodis et al. | 714/743 |
| 6,240,506 | B1 * | 5/2001 | Miller | 712/213 |
| 6,438,235 | B2 | 8/2002 | Sims, III | |
| 6,550,011 | B1 | 4/2003 | Sims, III | |
| 6,683,954 | B1 | 1/2004 | Searle | |
| 6,782,478 | B1 * | 8/2004 | Probert | 713/191 |
| 7,076,800 | B2 * | 7/2006 | Nishimura | 726/9 |
| 7,093,099 | B2 * | 8/2006 | Bodas et al. | 711/206 |
| 7,380,135 | B2 | 5/2008 | Nishimoto et al. | |
| 7,546,468 | B2 * | 6/2009 | Fujiwara et al. | 713/176 |
| 2002/0095382 | A1 * | 7/2002 | Taoka et al. | 705/50 |
| 2002/0114468 | A1 * | 8/2002 | Nishimura | 380/270 |
| 2002/0122553 | A1 * | 9/2002 | Kao et al. | 380/28 |
| 2003/0023960 | A1 * | 1/2003 | Khan et al. | 717/152 |
| 2003/0118189 | A1 * | 6/2003 | Ibi et al. | 380/277 |
| 2003/0195891 | A1 | 10/2003 | Marsh | |
| 2004/0034785 | A1 | 2/2004 | Tai et al. | |
| 2004/0117600 | A1 * | 6/2004 | Bodas et al. | 712/210 |
| 2006/0050870 | A1 * | 3/2006 | Kimmel et al. | 380/30 |
| 2007/0256122 | A1 * | 11/2007 | Foo et al. | 726/5 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

IEEE Std 802.11a-1999 (Supplement to IEEE Std 802.11-1999) [Adopted by ISO/IEC and redesignated as ISO/IEC 8802-11: 1999/ Amd 1:2000(E)]; Supplement to IEEE Standard for Information technology— Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

(Continued)

*Primary Examiner* — Aimee J Li (57) ABSTRACT

A processor includes an instruction fetcher, a decoder, and an instruction processor. The instruction fetcher retrieves encoded machine-language instructions. The encoded machine-language instructions are encoded according to a predetermined key assigned only to the processor. The predetermined key is independent of opcodes of the processor. The decoder decodes each of the encoded machine-language instructions according to the predetermined key. The instruction processor executes the decoded machine-language instructions.

36 Claims, 5 Drawing Sheets

OTHER PUBLICATIONS

IEEE Std 802.11b-1999/Cor 1-2001 (Corrigendum to IEEE Std 802.11-1999); IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 2: Higher-Speed Physical Layer (PHY) extension in the 2.4 GHz Band—Corrigendum 1; LAN/MAN Standards Committee of the IEEE Computer Society; Nov. 7, 2001; 23 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.11h —2003 (Amendment to IEEE Std 802.11, 1999 Edition (Reaff 2003)); as amended by IEEE Stds 802.11a-1999, 802.11b-1999, 802.11b-1999/Cor 1-2001, 802.11d-2001, and 802.11g-2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

802.11n; IEEE P802.11-04/0889r6; Wireless LANs, TGn Sync Proposal Technical Specification; 131 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 23 pages.

* cited by examiner

SECURE PROCESSORS HAVING ENCODED INSTRUCTIONS

BACKGROUND

The present invention relates generally to data processing. More particularly, the present invention relates to secure processors having encoded instructions.

Network devices such as computers and other data communications equipment are vulnerable to certain types of attacks that are implemented by causing the processor in the network device to execute malicious instructions in the form of machine-language instructions loaded into the network device by an attacker. For example, because the x86 processor is by far the most common type of processor in today's network devices, an attacker may simply assume that the target device is an x86 processor, and push x86 machine-language instructions into the processor of the network device after exploiting a flaw in the operating software stack. In the very likely event that the processor is an x86 processor, the processor unknowingly executes the machine-language instructions, thereby allowing the attacker to take control of the network device.

SUMMARY

In general, in one aspect, the invention features a processor comprising an instruction fetcher to retrieve encoded machine-language instructions, wherein the encoded machine-language instructions are encoded according to a predetermined key; a decoder to decode each of the encoded machine-language instructions according to the predetermined key; and an instruction processor to execute the decoded machine-language instructions.

Some embodiments comprise a memory to store one or more tables comprising associations between the encoded machine-language instructions and the decoded machine-language instructions, wherein the one or more tables are generated according to the predetermined key; wherein the decoder uses the one or more tables to decode each of the encoded machine-language instructions. In some embodiments, at least one of the encoded machine-language instructions comprises a fixed portion and a variable portion; and the decoder decodes only the fixed portion of the at least one of the encoded machine-language instructions. In some embodiments, the fixed portion of the at least one of the encoded machine-language instructions comprises opcodes in a machine language of the instruction processor. Some embodiments comprise an integrated circuit comprising the processor. Some embodiments comprise a network device incorporating the processor, the network device comprising: a communication circuit in communication with the processor. In some embodiments, the network device is selected from the group consisting of: a network switch; a router; and a network interface controller. Some embodiments comprise a wireless network device incorporating the processor, wherein the wireless network device is compliant with at least one standard selected from the group consisting of IEEE standards 802.11, 802.11a, 802.11b, 802.11e, 802.11g, 802.11k, 802.11n, 802.11v, 802.11w, 802.16, and 802.20. In some embodiments, the communication circuit comprises: a media access controller (MAC) having a MAC address; wherein the predetermined key is based on the MAC address.

In general, in one aspect, the invention features a processor comprising: instruction fetching means for retrieving encoded machine-language instructions, wherein the encoded machine-language instructions are encoded according to a predetermined key; decoding means for decoding each of the encoded machine-language instructions according to the predetermined key; and instruction processing means for executing the decoded machine-language instructions. Some embodiments comprise memory means for storing one or more tables comprising associations between the encoded machine-language instructions and the decoded machine-language instructions, wherein the one or more tables are generated according to the predetermined key; wherein the decoding means uses the one or more tables to decode each of the encoded machine-language instructions. In some embodiments, at least one of the encoded machine-language instructions comprises a fixed portion and a variable portion; and the decoding means decodes only the fixed portion of the at least one of the encoded machine-language instructions. In some embodiments, the fixed portion of the at least one of the encoded machine-language instructions comprises opcodes in a machine language of the instruction processing means. Some embodiments comprise an integrated circuit comprising the processor. Some embodiments comprise a network device incorporating the processor, the network device comprising: a communication circuit in communication with the processor. In some embodiments, the network device is selected from the group consisting of: a network switch; a router; and a network interface controller. Some embodiments comprise a wireless network device incorporating the processor, wherein the wireless network device is compliant with at least one standard selected from the group consisting of IEEE standards 802.11, 802.11a, 802.11b, 802.11e, 802.11g, 802.11k, 802.11n, 802.11v, 802.11w, 802.16, and 802.20. In some embodiments, the communication circuit comprises: a media access controller (MAC) having a MAC address; wherein the predetermined key is based on the MAC address.

In general, in one aspect, the invention features a method comprising: storing encoded machine-language instructions, wherein the encoded machine-language instructions are encoded according to a predetermined key; decoding each of the encoded machine-language instructions according to the predetermined key; and executing the decoded machine-language instructions.

Some embodiments comprise retrieving the encoded machine-language instructions from a memory. Some embodiments comprise storing one or more tables comprising associations between the encoded machine-language instructions and the decoded machine-language instructions, wherein the one or more tables are generated according to the predetermined key; wherein decoding each of the encoded machine-language instructions comprises using the one or more tables to decode the encoded machine-language instructions. Some embodiments comprise retrieving the one or more tables from a memory. In some embodiments, at least one of the encoded machine-language instructions comprises a fixed portion and a variable portion; and decoding each of the encoded machine-language instructions comprises decoding only the fixed portion of the at least one of the encoded machine-language instructions. In some embodiments, the fixed portion of the at least one of the encoded machine-language instructions comprises opcodes in a machine language employed in executing the decoded machine-language instructions. In some embodiments, the predetermined key is based on a media access controller (MAC) address.

Some embodiments comprise a computer program executable on a processor, comprising: instructions for storing encoded machine-language instructions, wherein the encoded machine-language instructions are encoded according to a predetermined key; instructions for decoding each of the encoded machine-language instructions according to the predetermined key; and instructions for executing the decoded machine-language instructions.

Some embodiments comprise instructions for retrieving the encoded machine-language instructions from a memory. Some embodiments comprise instructions for storing one or more tables comprising associations between the encoded machine-language instructions and the decoded machine-language instructions, wherein the one or more tables are generated according to the predetermined key; wherein the instructions for decoding each of the encoded machine-language instructions comprise instructions for using the one or more tables to decode the encoded machine-language instructions. Some embodiments comprise instructions for retrieving the one or more tables from a memory. In some embodiments, at least one of the encoded machine-language instructions comprises a fixed portion and a variable portion; and the instructions for decoding each of the encoded machine-language instructions comprise instructions for decoding only the fixed portion of the at least one of the encoded machine-language instructions. In some embodiments, the fixed portion of the at least one of the encoded machine-language instructions comprises opcodes in a machine language employed in executing the decoded machine-language instructions. In some embodiments, the predetermined key is based on a media access controller (MAC) address.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments of the present invention provide secure processors having encoded instructions. Such processors are especially useful for preventing attacks such as those described above.

According to a preferred embodiment of the present invention, each processor is assigned a key that is preferably unique. For example, the key can be the Media Access Control (MAC) address, or can be based upon the MAC address, of the network device comprising the processor. The processor code for each processor, for example code implementing the operating system for the processor, is encoded using the key assigned to that processor. Any sort of encoding scheme can be used. For example, a plurality of substitution schemes can be used, where each scheme is associated with one or more of the keys. In each substitution scheme, each instruction in the instruction set is mapped to a different predetermined substitute. With knowledge of which substitution scheme was used, for example using the key, the mapping can be used to recover the original instruction from the substitute.

The method of encoding the instruction set via tables may also vary depending on the instruction set being encoded. Each implementation of a secure processor may use a different method for that instruction set to allow for the most efficient mapping from key to final opcode.

Each processor comprises a decoder to decode instructions, as they are fetched and before execution, according to the key assigned to that processor. The decoder loads one or more decoding tables, preferably when the processor boots up, and then decodes each instruction by applying the instruction to one or more of the decoding tables. The decoding tables are generated using the key assigned to the processor, and preferably comprise mappings between the uncoded and encoded machine-language instructions for the processor.

Preferably some of the machine-language instructions comprise a fixed portion and a variable portion. The fixed portions preferably comprise machine-language opcodes in the machine language of the processor. In these embodiments, the decoder decodes only the fixed portions of the machine-language instructions.

Processors according to embodiments of the present invention can be fabricated as one or more integrated circuits. Embodiments of the present invention comprise network devices comprising the processors and communication circuits in communication with the processors. In the case of wireless network devices, the network devices are preferably compliant with at least one of IEEE standards 802.11, 802.11a, 802.11b, 802.11e, 802.11g, 802.11k, 802.11n, 802.11v, 802.11w, 802.16, and 802.20.

Figure 1:
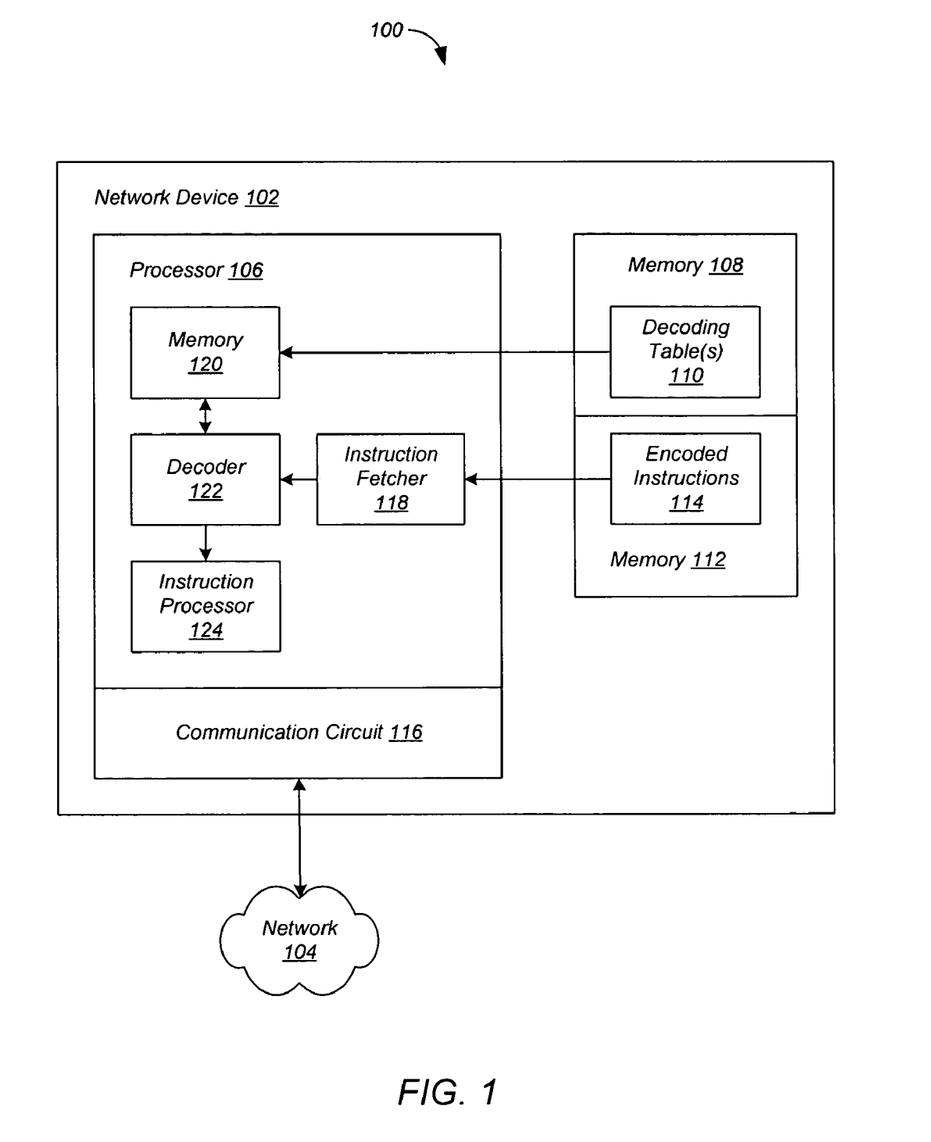
FIG. 1 shows a data communication system comprising a network device in communication with a network according to a preferred embodiment of the present invention.

FIG. 1 shows a data communication system 100 comprising a network device 102 in communication with a network 104 according to a preferred embodiment of the present invention. Network 104 can be implemented as a wide-area network such as the Internet, a local-area network (LAN), or the like. However, while embodiments of the present invention are described with respect to network communications, they are equally applicable to devices employing other forms of data communications such as direct links and the like.

Network device 102 comprises a processor 106, a memory 108 that is preferably non-volatile to store one or more decoding tables 110, a memory 112 that is preferably volatile to store encoded instructions 114 for processor 106, and a communication circuit 116. Processor 106 comprises an instruction fetcher 118 to fetch encoded instructions 114 from memory 112, a processor memory 120 to load and store decoding table(s) 110 from memory 108, a decoder 122 to decode encoded instructions 114 according to decoding table(s) 110, and an instruction processor 124 to execute the decoded instructions. Network device 102 can be implemented as any network device such as a computer, switch, router, network interface controller (NIC), and the like.

Figure 2:
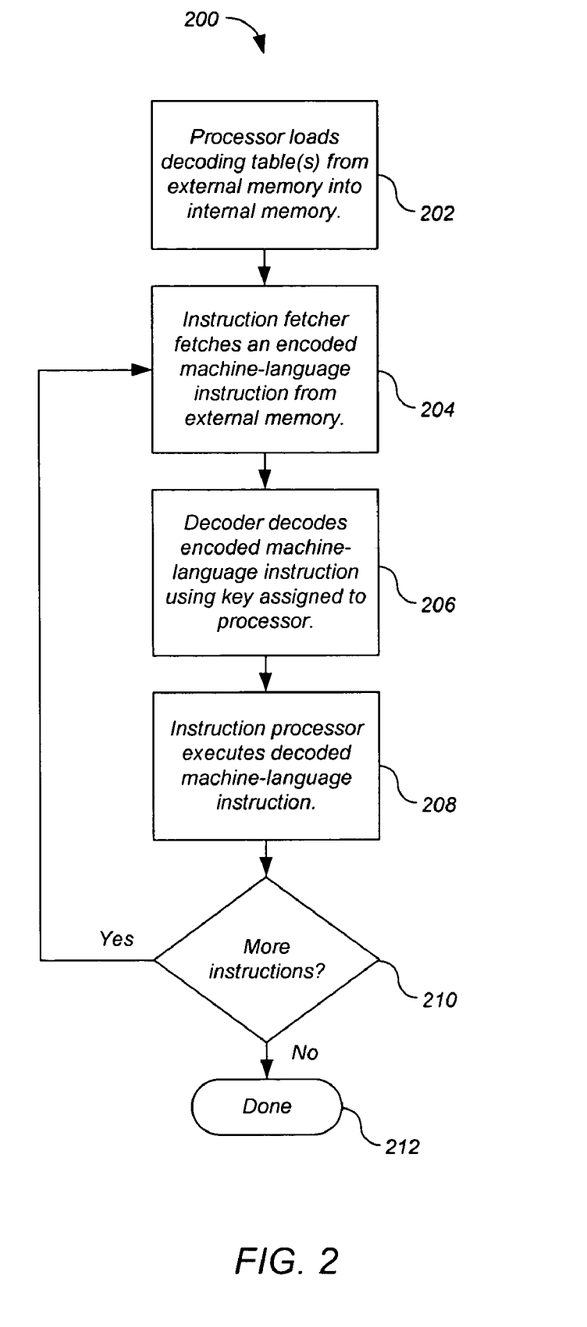
FIG. 2 shows a process for the network device of FIG. 1 according to a preferred embodiment of the present invention.

FIG. 2 shows a process 200 for network device 102 of FIG. 1 according to a preferred embodiment of the present invention. Although in the described embodiments, the elements of process 200 are presented in one arrangement, other embodiments may feature other arrangements, as will be apparent to one skilled in the relevant arts based on the disclosure provided herein.

In embodiments employing external decoding table(s) 110, processor 106 loads decoding table(s) 110 from memory 108 into processor memory 120 (step 202), preferably as part of a bootstrapping process so that decoding table(s) 110 are available in processor memory 120 when the first encoded instruction 114 is fetched.

Instruction fetcher 118 fetches an encoded machine-language instruction 114 from memory 112 (step 204), for example according to a program counter (not shown). As described above, encoded instructions 114 are encoded according to a key assigned to processor 106. The key is preferably unique to network device 102, and can be based on a MAC address of network device 102, for example. The key can be a single key, a pairwise key, or the like, as will be apparent to one skilled in the relevant arts based on the disclosure provided herein. The instructions are preferably encoded during linking, but can be encoded during other processes, for example during assembly and the like.

After each encoded instruction 114 is fetched, decoder 122 decodes the encoded machine-language instruction according to the key assigned to processor 106 (step 206), thereby recovering the original instruction as it was before being encoded. Decoder 122 applies the machine-language encoded instruction to decoding table(s) 110 stored in processor memory 120. Preferably each decoding table(s) 110 comprises associations between all or part of encoded machine-language instructions and the corresponding decoded machine-language instructions, and are generated according to the key assigned to processor 106. Where multiple decoding tables 110 are used, each decoding table 110 can include mappings for a different field of the instruction. For example, one decoding table 110 can include mappings for opcodes, while another decoding table 110 can include mappings for operands, and so on.

However, when decoding does not result in a legal processor instruction, a processor fault results, such as a general protection fault and the like. For example, if an attacker pushes instructions that have not been properly encoded according to embodiments of the present invention, decoding will produce an illegal instruction, which will result in a processor fault. Therefore, the attacker will be unable to further penetrate the system.

In some embodiments, a machine-language instruction 114 may comprise a fixed portion and a variable portion. For example, the fixed portions of machine-language instructions 114 can comprise machine-language opcodes in a machine-language of processor 106. In these embodiments, only the fixed portions of machine-language instructions 114 are decoded.

After decoding, instruction processor 124 executes the decoded machine-language instructions according to well-known techniques (step 208). If more instructions are to be executed (step 210), instruction fetcher 118 then fetches another encoded machine-language instruction 114 from memory 112 (returning to step 204). Otherwise, process 200 is done (step 212).

Figure 3A:
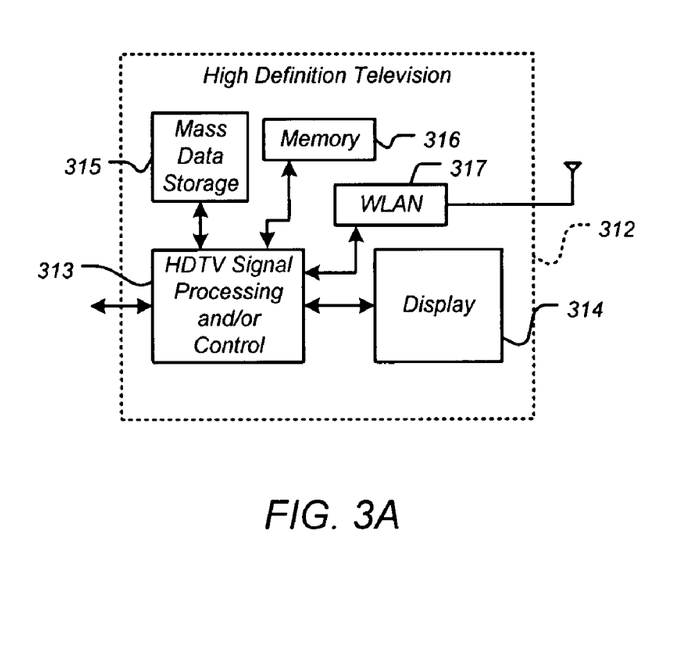
FIGS. 3A-3E show various exemplary implementations of the present invention.

FIGS. 3A-3E show various exemplary implementations of the present invention. Referring now to FIG. 3A, the present invention can be implemented in a high definition television (HDTV) 312. The present invention may implement either or both signal processing and/or control circuits, which are generally identified in FIG. 3A at 313, a WLAN interface and/or mass data storage of the HDTV 312. The HDTV 312 receives HDTV input signals in either a wired or wireless format and generates HDTV output signals for a display 314. In some implementations, signal processing circuit and/or control circuit 313 and/or other circuits (not shown) of the HDTV 312 may process data, perform coding and/or encryption, perform calculations, format data and/or perform any other type of HDTV processing that may be required.

The HDTV 312 may communicate with mass data storage 315 that stores data in a nonvolatile manner such as optical and/or magnetic storage devices. The HDD may be a mini HDD that includes one or more platters having a diameter that is smaller than approximately 1.8". The HDTV 312 may be connected to memory 316 such as RAM, ROM, low latency nonvolatile memory such as flash memory and/or other suitable electronic data storage. The HDTV 312 also may support connections with a WLAN via a WLAN network interface 317.

Figure 3B:
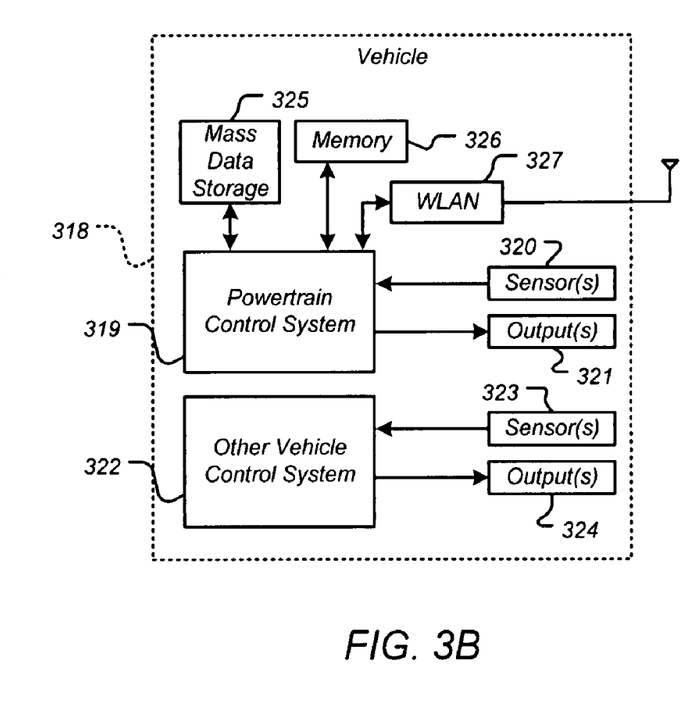

Referring now to FIG. 3B, the present invention implements a control system of a vehicle 318, a WLAN interface and/or mass data storage of the vehicle control system. In some implementations, the present invention implements a powertrain control system 319 that receives inputs from one or more sensors such as temperature sensors, pressure sensors, rotational sensors, airflow sensors 320 and/or any other suitable sensors and/or that generates one or more outputs 321 such as engine operating parameters, transmission operating parameters, and/or other control signals.

The present invention may also be implemented in other control systems 322 of the vehicle 318. The control system 322 may likewise receive signals from input sensors 323 and/or output control signals to one or more output devices 324. In some implementations, the control system 322 may be part of an anti-lock braking system (ABS), a navigation system, a telematics system, a vehicle telematics system, a lane departure system, an adaptive cruise control system, a vehicle entertainment system such as a stereo, DVD, compact disc system and the like. Still other implementations are contemplated.

The powertrain control system 319 may communicate with mass data storage 325 that stores data in a nonvolatile manner. The mass data storage 325 may include optical and/or magnetic storage devices for example hard disk drives (HDDs) and/or DVD drives. The HDD may be a mini HDD that includes one or more platters having a diameter that is smaller than approximately 1.8". The powertrain control system 319 may be connected to memory 326 such as RAM, ROM, low latency nonvolatile memory such as flash memory and/or other suitable electronic data storage. The powertrain control system 319 also may support connections with a WLAN via a WLAN network interface 327. The control system 322 may also include mass data storage, memory and/or a WLAN interface (all not shown).

Figure 3C:
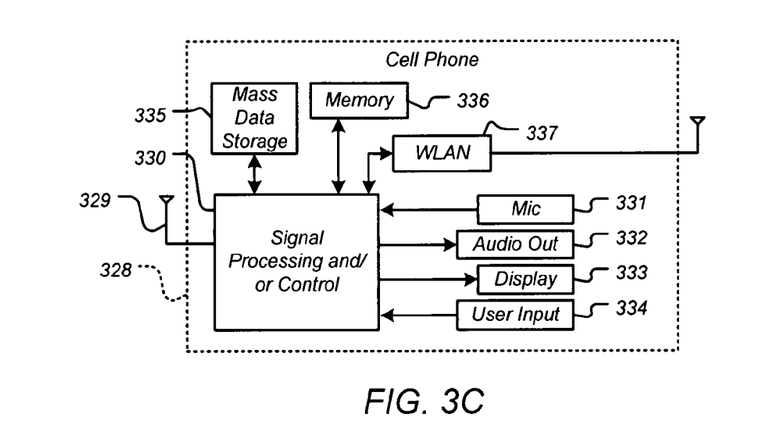

Referring now to FIG. 3C, the present invention can be implemented in a cellular phone 328 that may include a cellular antenna 329. The present invention may implement either or both signal processing and/or control circuits, which are generally identified in FIG. 3C at 330, a WLAN interface and/or mass data storage of the cellular phone 328. In some implementations, the cellular phone 328 includes a microphone 331, an audio output 332 such as a speaker and/or audio output jack, a display 333 and/or an input device 334 such as a keypad, pointing device, voice actuation and/or other input device. The signal processing and/or control circuits 330 and/or other circuits (not shown) in the cellular phone 328 may process data, perform coding and/or encryption, perform calculations, format data and/or perform other cellular phone functions.

The cellular phone 328 may communicate with mass data storage 335 that stores data in a nonvolatile manner such as optical and/or magnetic storage devices for example hard disk drives (HDDs) and/or DVD drives. The HDD may be a mini HDD that includes one or more platters having a diameter that is smaller than approximately 1.8". The cellular phone 328 may be connected to memory 336 such as RAM, ROM, low latency nonvolatile memory such as flash memory and/or other suitable electronic data storage. The cellular phone 328 also may support connections with a WLAN via a WLAN network interface 337.

Figure 3D:
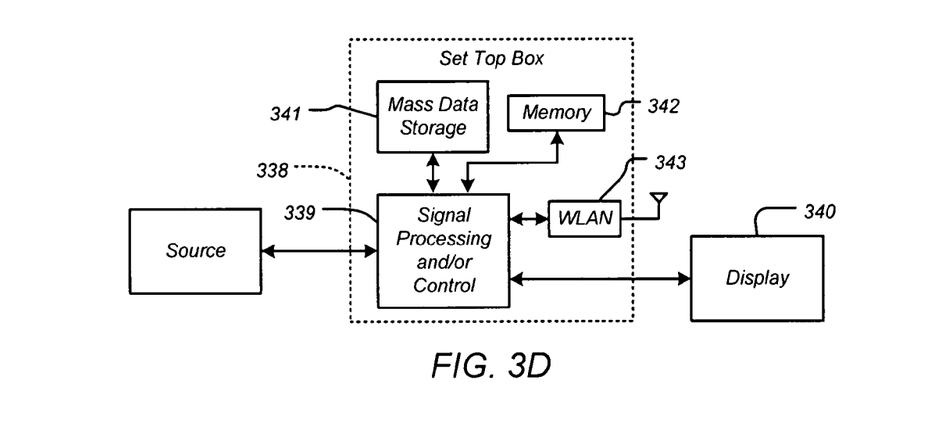

Referring now to FIG. 3D, the present invention can be implemented in a set top box 338. The present invention may implement either or both signal processing and/or control circuits, which are generally identified in FIG. 3D at 339, a WLAN interface and/or mass data storage of the set top box 338. The set top box 338 receives signals from a source such as a broadband source and outputs standard and/or high definition audio/video signals suitable for a display 340 such as a television and/or monitor and/or other video and/or audio output devices. The signal processing and/or control circuits 339 and/or other circuits (not shown) of the set top box 338 may process data, perform coding and/or encryption, perform calculations, format data and/or perform any other set top box function.

The set top box 338 may communicate with mass data storage 341 that stores data in a nonvolatile manner. The mass data storage 341 may include optical and/or magnetic storage devices for example hard disk drives (HDDs) and/or DVD drives. The HDD may be a mini HDD that includes one or more platters having a diameter that is smaller than approximately 1.8". The set top box 338 may be connected to memory 342 such as RAM, ROM, low latency nonvolatile memory such as flash memory and/or other suitable electronic data storage. The set top box 338 also may support connections with a WLAN via a WLAN network interface 343.

Figure 3E:
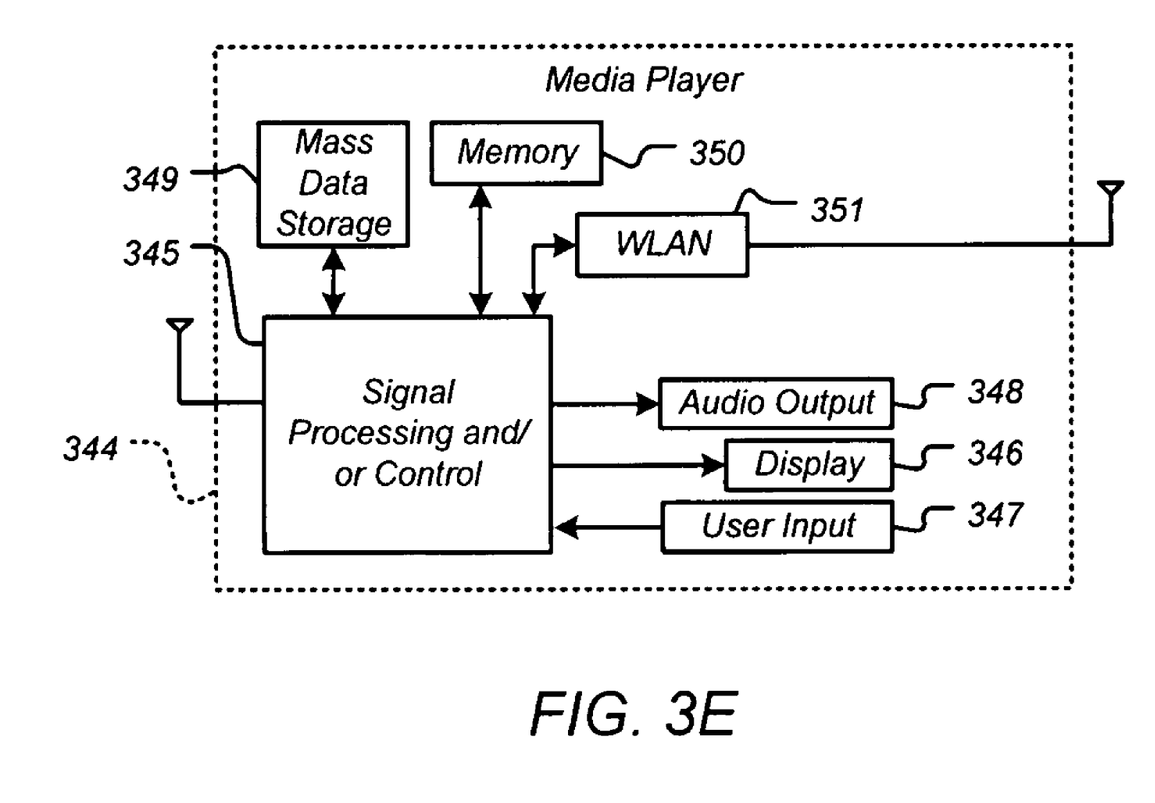

Referring now to FIG. 3E, the present invention can be implemented in a media player 344. The present invention may implement either or both signal processing and/or control circuits, which are generally identified in FIG. 3E at 345, a WLAN interface 351 and/or mass data storage 349 of the media player 344. In some implementations, the media player 344 includes a display 346 and/or a user input 347 such as a keypad, touchpad and the like. In some implementations, the media player 344 may employ a graphical user interface (GUI) that typically employs menus, drop down menus, icons and/or a point-and-click interface via the display 346 and/or user input 347. The media player 344 further includes an audio output 348 such as a speaker and/or audio output jack. The signal processing and/or control circuits 345 and/or other circuits (not shown) of the media player 344 may process data, perform coding and/or encryption, perform calculations, format data and/or perform any other media player function.

The media player 344 may communicate with mass data storage 349 that stores data such as compressed audio and/or video content in a nonvolatile manner. In some implementations, the compressed audio files include files that are compliant with MP3 format or other suitable compressed audio and/or video formats. The mass data storage 349 may include optical and/or magnetic storage devices for example hard disk drives (HDDs) and/or DVD drives. The HDD may be a mini HDD that includes one or more platters having a diameter that is smaller than approximately 1.8". The media player 344 may be connected to memory 350 such as RAM, ROM, low latency nonvolatile memory such as flash memory and/or other suitable electronic data storage. The media player 344 also may support connections with a WLAN via a WLAN network interface 351. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A processor comprising:
   an instruction fetcher to retrieve encoded machine-language instructions, wherein the encoded machine-language instructions are encoded according to a predetermined key assigned only to the processor, and wherein the predetermined key is independent of opcodes of the processor;
   a decoder to decode each of the encoded machine-language instructions according to the predetermined key; and
   an instruction processor to execute the decoded machine-language instructions.

2. The processor of claim 1, further comprising:
   a memory to store one or more tables comprising associations between the encoded machine-language instructions and the decoded machine-language instructions, wherein the one or more tables are generated according to the predetermined key;
   wherein the decoder uses the one or more tables to decode each of the encoded machine-language instructions.

3. The processor of claim 1:
   wherein at least one of the encoded machine-language instructions comprises a fixed portion and a variable portion; and
   wherein the decoder decodes only the fixed portion of the at least one of the encoded machine-language instructions.

4. The processor of claim 3:
   wherein the fixed portion of the at least one of the encoded machine-language instructions comprises opcodes in a machine language of the instruction processor.

5. An integrated circuit comprising the processor of claim 1.

6. A network device incorporating the processor according to claim 1, the network device comprising:
   a communication circuit in communication with the processor.

7. The network device of claim 6, wherein the network device is selected from a group consisting of:
- a network switch;
- a router; and
- a network interface controller.

8. A wireless network device incorporating the processor according to claim 6, wherein the wireless network device is compliant with at least one standard selected from a group consisting of IEEE standards 802.11, 802.11a, 802.11b, 802.11e, 802.11g, 802.11k, 802.11n, 802.11v, 802.11w, 802.16, and 802.20.

9. The network device of claim 6, wherein the communication circuit comprises:
- a media access controller (MAC) having a MAC address;
- wherein the predetermined key is based on the MAC address.

10. The processor of claim 1:
- wherein the decoder decodes each of the encoded machine-language instructions according to the predetermined key to recover original machine-language instructions.

11. The processor of claim 1:
- wherein a processor fault occurs when one of the decoded machine-language instructions is different than each one of original machine-language instructions.

12. The processor of claim 1:
- wherein the encoded machine-language instructions include predetermined substitute instructions for original machine-language instructions; and
- wherein the predetermined substitute instructions are mapped to the original machine-language instructions based on the predetermined key.

13. The processor of claim 12:
- wherein the decoder recovers the original machine-language instructions from the predetermined substitute instructions using the predetermined key.

14. A processor comprising:
- instruction fetching means for retrieving encoded machine-language instructions, wherein the encoded machine-language instructions are encoded according to a predetermined key assigned only to the processor, and wherein the predetermined key is independent of opcodes of the processor;
- decoding means for decoding each of the encoded machine-language instructions according to the predetermined key; and
- instruction processing means for executing the decoded machine-language instructions.

15. The processor of claim 14, further comprising:
- memory means for storing one or more tables comprising associations between the encoded machine-language instructions and the decoded machine-language instructions, wherein the one or more tables are generated according to the predetermined key;
- wherein the decoding means uses the one or more tables to decode each of the encoded machine-language instructions.

16. The processor of claim 14:
- wherein at least one of the encoded machine-language instructions comprises a fixed portion and a variable portion; and
- wherein the decoding means decodes only the fixed portion of the at least one of the encoded machine-language instructions.

17. The processor of claim 16:
- wherein the fixed portion of the at least one of the encoded machine-language instructions comprises opcodes in a machine language of the instruction processing means.

18. An integrated circuit comprising the processor of claim 14.

19. A network device incorporating the processor according to claim 14, the network device comprising:
- means for communicating in communication with the processor.

20. The network device of claim 19, wherein the network device is selected from a group consisting of:
- a network switch;
- a router; and
- a network interface controller.

21. A wireless network device incorporating the processor according to claim 19, wherein the wireless network device is compliant with at least one standard selected from a group consisting of IEEE standards 802.11, 802.11a, 802.11b, 802.11e, 802.11g, 802.11k, 802.11n, 802.11v, 802.11w, 802.16, and 802.20.

22. The network device of claim 19:
- wherein the means for communicating is associated with a media access controller (MAC) address;
- wherein the predetermined key is based on the MAC address.

23. A method for a processor, the method comprising:
- storing encoded machine-language instructions, wherein the encoded machine-language instructions are encoded according to a predetermined key assigned only to the processor, and wherein the predetermined key is independent of opcodes of the processor;
- decoding each of the encoded machine-language instructions according to the predetermined key; and
- executing the decoded machine-language instructions.

24. The method of claim 23, further comprising:
- retrieving the encoded machine-language instructions from a memory.

25. The method of claim 23, further comprising:
- storing one or more tables comprising associations between the encoded machine-language instructions and the decoded machine-language instructions, wherein the one or more tables are generated according to the predetermined key;
- wherein decoding each of the encoded machine-language instructions comprises using the one or more tables to decode the encoded machine-language instructions.

26. The method of claim 25, further comprising:
- retrieving the one or more tables from a memory.

27. The method of claim 23:
- wherein at least one of the encoded machine-language instructions comprises a fixed portion and a variable portion; and
- wherein decoding each of the encoded machine-language instructions comprises decoding only the fixed portion of the at least one of the encoded machine-language instructions.

28. The method of claim 27:
- wherein the fixed portion of the at least one of the encoded machine-language instructions comprises opcodes in a machine language employed in executing the decoded machine-language instructions.

29. The method of claim 23:
- wherein the predetermined key is based on a media access controller (MAC) address.

30. A computer program executable on a processor, comprising:
- instructions for storing encoded machine-language instructions, wherein the encoded machine-language instructions are encoded according to a predetermined key assigned only to the processor, and wherein the predetermined key is independent of opcodes of the processor;

instructions for decoding each of the encoded machine-language instructions according to the predetermined key; and instructions for executing the decoded machine-language instructions.

31. The computer program of claim 30, further comprising:
instructions for retrieving the encoded machine-language instructions from a memory.

32. The computer program of claim 30, further comprising:
instructions for storing one or more tables comprising associations between the encoded machine-language instructions and the decoded machine-language instructions, wherein the one or more tables are generated according to the predetermined key;
wherein the instructions for decoding each of the encoded machine-language instructions comprise instructions for using the one or more tables to decode the encoded machine-language instructions.

33. The computer program of claim 32, further comprising:
instructions for retrieving the one or more tables from a memory.

34. The computer program of claim 30:
wherein at least one of the encoded machine-language instructions comprises a fixed portion and a variable portion; and
wherein the instructions for decoding each of the encoded machine-language instructions comprise instructions for decoding only the fixed portion of the at least one of the encoded machine-language instructions.

35. The computer program of claim 34:
wherein the fixed portion of the at least one of the encoded machine-language instructions comprises opcodes in a machine language employed in executing the decoded machine-language instructions.

36. The computer program of claim 30:
wherein the predetermined key is based on a media access controller (MAC) address.

* * * * *